(12) United States Patent
Bouchard et al.

(10) Patent No.: US 10,649,984 B2
(45) Date of Patent: May 12, 2020

(54) ONLINE TRANSACTION VALIDATION USING A LOCATION OBJECT

(71) Applicant: BCE INC., Verdun (CA)

(72) Inventors: Jean Bouchard, Sillery (CA);
Stéphane Maxime François Fortier, Breakeyville (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 15/726,824

(22) Filed: Oct. 6, 2017

(65) Prior Publication Data
US 2018/0032569 A1 Feb. 1, 2018

Related U.S. Application Data

(63) Continuation of application No. 12/162,297, filed as application No. PCT/CA2007/002188 on Dec. 5, 2007, now abandoned.

(60) Provisional application No. 60/941,830, filed on Jun. 4, 2007.

(51) Int. Cl.
| | |
|---|---|
| *G06Q 40/00* | (2012.01) |
| *G06F 16/24* | (2019.01) |
| *G06Q 20/02* | (2012.01) |
| *G06Q 20/10* | (2012.01) |
| *G06Q 20/40* | (2012.01) |
| *G06Q 30/02* | (2012.01) |
| *H04L 29/06* | (2006.01) |
| *H04W 4/02* | (2018.01) |
| *H04L 29/08* | (2006.01) |

(52) U.S. Cl.
CPC .............. *G06F 16/24* (2019.01); *G06Q 20/02* (2013.01); *G06Q 20/10* (2013.01); *G06Q 20/40* (2013.01); *G06Q 30/0254* (2013.01); *G06Q 30/0264* (2013.01); *G06Q 40/00* (2013.01); *G06Q 40/12* (2013.12); *H04L 63/0892* (2013.01); *H04L 67/10* (2013.01); *H04W 4/023* (2013.01)

(58) Field of Classification Search
CPC .............. G06Q 20/32; G06Q 20/40145; G06Q 20/3278; G06Q 20/3821; G06Q 40/00
USPC ........................................ 705/35, 43, 44, 64
See application file for complete search history.

(56) References Cited

U.S. PATENT DOCUMENTS

2005/0108177 A1* 5/2005 Sancho .................. G06F 21/33
705/64

* cited by examiner

*Primary Examiner* — Ojo O Oyebisi

(57) ABSTRACT

A method that comprises obtaining from end user equipment a location object caused to be stored on the end user equipment by a service provider; and validating an online transaction attempted using the end user equipment, based at least in part on the location object so obtained. The method may further comprise obtaining transaction object information provided via the end user equipment; and obtaining information to assist in validating online transactions attempted using the transaction object information. The validating of the online transaction may comprise comparing a location specified by the location object to the information to assist in validating online transactions attempted using the transaction object information and taking a validation action based on a result of the comparing.

10 Claims, 6 Drawing Sheets

57ⱼ: Information pertaining to transaction object "j" | Information to assist in validating an online transaction attempted using the transaction object information pertaining to transaction object "j" | Ancillary information 57ₖ: Information pertaining to transaction object "k" | Information to assist in validating an online transaction attempted using the transaction object information pertaining to transaction object "k" | Ancillary information 57ₘ: Information pertaining to transaction object "m" | Information to assist in validating an online transaction attempted using the transaction object information pertaining to transaction object "m" | Ancillary information

57ₚ

ONLINE TRANSACTION VALIDATION USING A LOCATION OBJECT

CROSS-REFERENCE TO RELATED APPLICATION

The present application is a Continuation of U.S. application Ser. No. 12/162,297, which is a National Phase entry of International Application No. PCT/CA2007/002188, filed Dec. 5, 2007 claims the benefit of U.S. Provisional Application Ser. No. 60/941,830, filed on Jun. 4, 2007, hereby incorporated by reference herein.

FIELD OF THE INVENTION

The present invention relates generally to online transactions and, more particularly, to methods, apparatuses and computer-readable media for validating online transactions using an element of information referred to as a location object.

BACKGROUND

Online transactions are now widely used to effect electronic commerce (e-commerce). One common type of online transaction involves an electronic payment by a first party to a second party, for example, to purchase goods or services. This electronic payment is typically effected by the first party entering payment card information at his/her computer. Information pertaining to the online transaction attempted to be made, including the entered payment card information, is transmitted over a computer network (e.g., the Internet) and a financial network to different computers which process this information in order to approve or deny the online transaction. Approval or denial of the online transaction is communicated to the first party via his/her computer and, if approved, settlement of the online transaction takes place between the first party's card issuing bank and the second party's acquiring bank.

While computer networking makes online transactions convenient and efficient, it also exposes a potential for fraudulent activity and thus one major area of interest with online transactions is fraud prevention. Accordingly, various security measures have been implemented to counter fraudulent online transactions. Example security measures include data encryption, card security code (CSC) verification (where an individual attempting to make an online transaction using a payment card is asked to enter the payment card's CSC), and address verification systems (AVS—where an address entered by an individual attempting to make an online transaction using a payment card is compared to a billing address known to the payment card's issuing bank).

Although such security measures help reduce the potential for fraud to a certain degree, they do not insulate online transactions from equally—if not more—severe forms of attack, including conventional theft of physical cards and the emerging threat posed by identity theft. As the volume of online transactions continues to grow, there is clearly a pressing need in the industry to combat online fraud more effectively than has been done in the past.

SUMMARY OF THE INVENTION

According to a first broad aspect, the present invention seeks to provide a method, comprising: obtaining from end user equipment a location object caused to be stored on the end user equipment by a service provider; and validating an online transaction attempted using the end user equipment, based at least in part on the location object.

According to a second broad aspect, the present invention seeks to provide a computer-readable medium storing a program element for execution by a computer. The program element comprises first program code for causing the computer to obtain from end user equipment a location object caused to be stored on the end user equipment by a service provider; and second program code for causing the computer to validate an online transaction attempted using the end user equipment, based at least in part on the location object.

According to a third broad aspect, the present invention seeks to provide an apparatus, comprising: an interface for communication with end user equipment over a network; and a processing unit coupled to the interface. The processing unit is configured to: obtain from the end user equipment via the interface a location object caused to be stored on the end user equipment by a service provider; and validate an online transaction attempted using the end user equipment, based at least in part on the location object.

According to a fourth broad aspect, the present invention seeks to provide an apparatus, which comprises means for obtaining from end user equipment a location object caused to be stored on the end user equipment by a service provider; and means for validating an online transaction attempted using the end user equipment based on the location object.

According to a fifth broad aspect, the present invention seeks to provide a method for execution by end user equipment connected to a network. The method comprises storing in a memory a location object provided by a service provider; and sending the location object to a server over the network for validation of an online transaction attempted using the end user equipment.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which:

FIG. 2 shows an example of potential contents of a database accessible to a transaction validation server of the architecture shown in FIG. 1.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
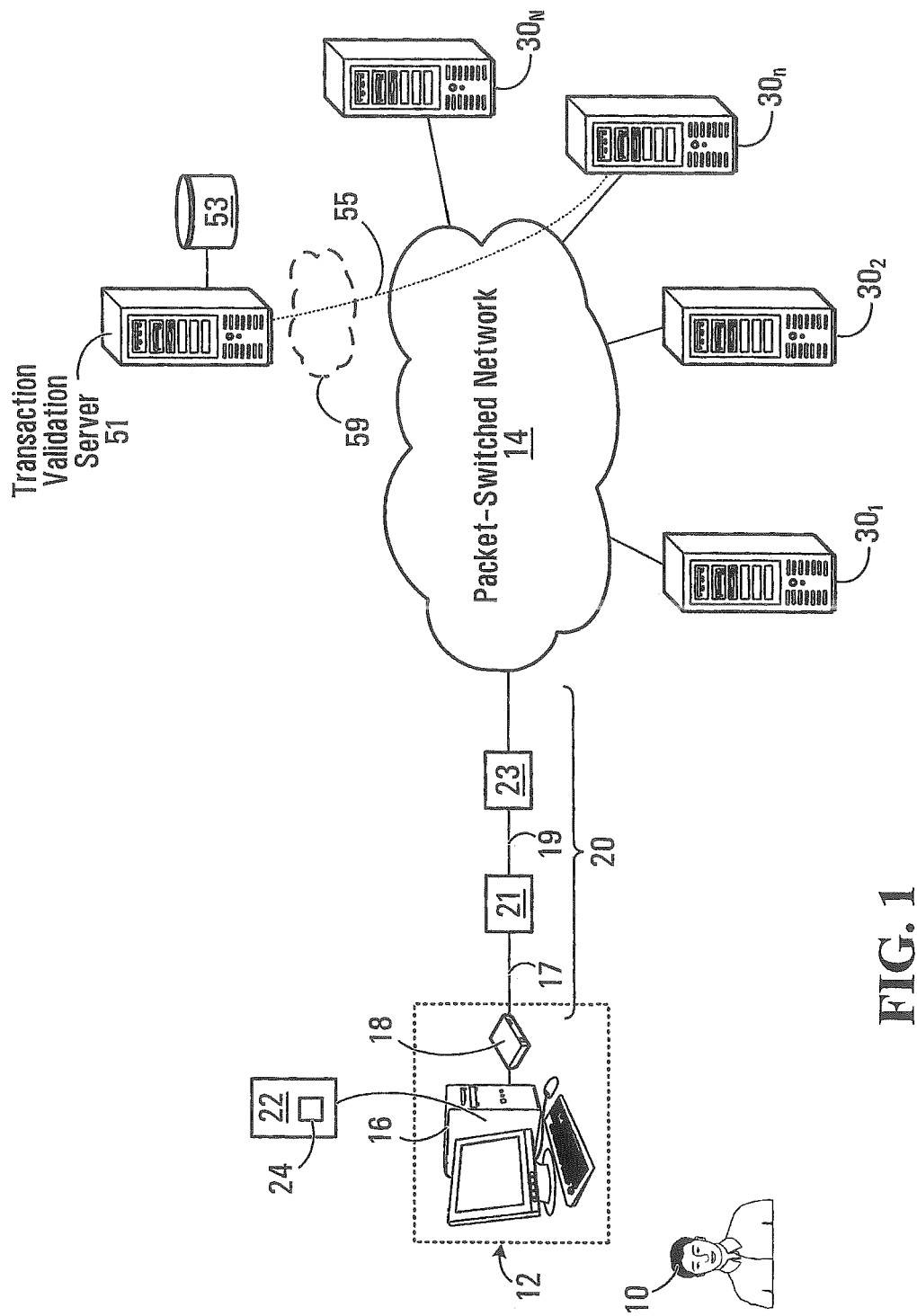
FIG. 1 shows an architecture allowing a user of end user equipment connected to a packet-switched network to access and interact with network sites of that network, for example, to make online transactions, in accordance with an embodiment of the present invention.

FIG. 1 depicts an architecture allowing a user 10 of end user equipment 12 connected to a packet-switched network 14 (e.g., the Internet or a private network) to access and interact with network sites (e.g., web sites) of that network, in accordance with a non-limiting embodiment of the present invention.

In this embodiment, the end user equipment 12 comprises a computing device 16 and a network interface unit 18. For example, the computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between the user 10 and the computing device 16. The computing device 16 is operative to run a software application implementing a network browser (e.g., a web browser) with which the user 10 can interact via the display (and possibly one or more other output devices) and the at least one input device in order to access and interact with network sites of the packet-switched network 14.

The network interface unit 18 enables the end user equipment 12 to exchange data with the packet-switched network 14 via a communication link 20. For example, in various embodiments, and depending on the nature of the communication link 20, the network interface unit 18 may be implemented as a modem such as a broadband modem (e.g., a digital subscriber line (DSL) modem or a cable modem) or a narrowband modem (e.g., a dial-up modem). In other embodiments, such as in the case of Fiber to the premises (FTTP), the network interface 18 may be implemented as an optical network termination (ONT)-based Ethernet connection. Although it is shown as being a separate component in FIG. 1, the network interface unit 18 may be integrated into the computing device 16 (e.g., it may be a card internal to the computing device 16).

The communication link 20 may traverse one or more network elements and may comprise one or more physical links and one or more logical links. For example, the communication link 20 may comprise a physical link 17 between the network interface unit 18 and a network element 21. The physical link 17 may comprise a copper twisted pair, a coax cable, an Ethernet link, a fiber optic link (e.g., in the case of FTTP), a fixed wireless link, a satellite link, or a combination thereof. Depending on the nature of the physical link 17, the network element 21 may be a DSL access multiplexer (DSLAM), a cable modem termination system (CMTS), or another type of network element. The communication link 20 may also comprise a dedicated logical link 19 between the network element 21 and another network element 23 that provides access to the packet-switched network 14. For instance, the network element 23 may be a network access server (NAS), a router, etc. It will be appreciated that the communication link 20 may take on many forms in various embodiments.

While in this embodiment the end user equipment 12 comprises the computing device 16 and the network interface unit 18, it will be appreciated that the end user equipment 12 may comprise other components in other embodiments.

In order to exchange data with the packet-switched network 14, the end user equipment 12 may be assigned a logical identifier. The logical identifier, which may in fact be assigned to the computing device 16 or the network interface unit 18 (both forming part of the end user equipment 12 in this embodiment), may be an Internet Protocol (IP) address (e.g., in compliance with IPv4 or IPv6) or a proprietary address, label, or tag. The logical identifier may be statically assigned to the end user equipment 12 in which case it does not change over time (e.g., a static IP address). Alternatively, the logical identifier may be dynamically assigned to the end user equipment 12 in which case it may change over time (e.g., a dynamic IP address).

For example, the logical identifier may be assigned to the end user equipment 12 by a network element that is part of the communication link 20 (e.g., the network element 23 in embodiments where it is a network access server). This network element may assign the logical identifier to the end user equipment 12 when the end user equipment 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network element assigning the dynamic IP address to the end user equipment 12 may do so in accordance with the Dynamic Host Configuration Protocol (DHCP) using a pool of IP addresses accessible to that network element. It will be recognized that assignment of the logical identifier to the end user equipment 12 may be effected in various ways in various embodiments.

The computing device 16 has a memory 22 that stores a location object 24. The location object 24 is an element of information which specifies a physical location.

In some embodiments, the location specified by the location object 24 corresponds to a location of a service point (hereinafter "service point location") where the end user equipment 12 is located. A "service point" refers to a point where a network access service is provided to the user 10 by a service provider, such as an Access Service Provider (ASP), a Regional Access Network Provider (RANP) or an Internet Service Provider (ISP). By way of a specific non-limiting example, a service point may be a house or other building, or an area thereof. An approach for determining the service point location where the end user equipment 12 is located is described in U.S. Pat. No. 7,079,637 to Crago et al., issued Jul. 18, 2006, hereby incorporated by reference herein.

In other embodiments, the location specified by the location object 24 can specify the current position of the end user equipment 12, as detected or measured by other means (e.g., triangulation). The current position can be specified to any desired resolution. For example, the current position can be specified to the level of which network access point is being used by the end user equipment 12. Such an approach may be used by cable companies and various online search engines and online advertisement providers. Still other levels of precision/accuracy/resolution are within the scope of the present invention.

The location specified by the location object 24 may be expressed as a geo location (latitude, longitude, elevation, and the datum which identifies the coordinate system used, such as, without limitation, the World Geodetic System 1984 (WGS841) datum). Alternatively or in addition, the location specified by the location object 24 may be expressed as a civic location (a set of elements that describe detailed street address information). Still other possibilities exist and are within the scope of the invention.

In a specific non-limiting embodiment, the location object 24 may be formatted as a Presence Information Document Format—Location Object (PIDF-LO) as defined by the Internet Engineering Task Force (IETF) in a variety of documents hereby incorporated by reference herein, including RFC 4119, "draft-ietf-geopriv-pidf-lo-profile-10" and "draft-ietf-geopriv-revised-civic-lo-06" available from http://tools.ietf.org/wg/geopriv/ and incorporated by reference herein. Another possible format for the location object 24 is an XML format, a description of which can be found in "Geographic Markup Language", available from http://www.opengeospatial.org/standards/gml, hereby incorporated by reference herein. Still other possibilities exist and are within the scope of the invention.

In accordance with embodiments of the present invention, the service provider determines the service point location where the end user equipment 12 is located, or determines the current position of the end user equipment 12, and then generates the location object 24. The service provider subsequently causes storage of the location object 24 in the memory 22 of the computing device 16. For example, the network element 23 may receive a request for network access by the end user equipment 12. The network element 23 may then consult a location information server (LIS—not shown) that stores the location object 24 to be stored on the end user equipment 12. The network element 23 may then send the location object 24 to the end user equipment 12 over the communication link 20. The end user equipment 12 may then store the location object 24 in the memory 22. It should be appreciated that variations may be made in the above procedure without departing from the scope of the invention, with the end result being the same, namely that the service provider causes the location object 24 to be stored in the memory 22 of the computing device 16.

Should there be a change in the service point location where the end user equipment 12 is located, or in the current position of the end user equipment 12, the above procedure may be repeated, so that the location object 24 is kept up to date.

As mentioned previously, the user 10 can use the end user equipment 12 to access and interact with network sites of the packet-switched network 14. These network sites are implemented by servers $30_1 \ldots 30_N$ connected to the packet-switched network 14. The servers $30_1 \ldots 30_N$ and the network sites that they implement are operated, managed or otherwise associated with various entities, including, for example, companies, governmental organizations, non-profit organizations, and individuals.

Each of the servers $30_1 \ldots 30_N$ comprises suitable hardware, firmware, software, control logic, or a combination thereof for implementing a plurality of functional components, including an interface and a processing unit. The interface of each of the servers $30_1 \ldots 30_N$ is adapted to receive messages from and send messages to communication equipment (such as the end user equipment 12) connected to the packet-switched network 14, as well as to receive data from or send data to other elements (e.g., computers or databases) communicatively coupled to that server but not necessarily connected to the packet-switched network 14. The processing unit of each of the servers $30_1 \ldots 30_N$ is adapted to effect various processing operations to implement that server's functionality.

Interaction of the user 10 with a network site implemented by a server $30_n$ ($1 \le n \le N$) typically involves the network browser implemented by the computing device 16 interacting with the server $30_n$ in order to allow the user 10 to view, hear or otherwise be exposed to content (e.g., web pages) of the network site via the display and/or one or more other output devices of the computing device 16, and to input information (e.g., by entering text, selecting an option, etc.) and/or one or more commands (e.g., by clicking on a graphical button or a hyperlink) via the at least one input device of the computing device 16.

Occasionally, during his/her interaction with the network site implemented by the server $30_n$, the user 10 may desire or need to effect an online transaction. For example, and depending on the nature of the network site, the user 10 may desire or need to: purchase or otherwise obtain a product and/or a service and/or content offered on the network site; pay a bill for a previously obtained product/service/content via the network site; transfer funds from one account to another via the network site; trade securities (e.g., stocks, bonds, etc.) via the network site; make a donation to a charity or other institution through the network site; access secure online content via the network site; access a virtual private network via the network site; etc. It will be appreciated that various other situations may arise in which online transactions may be desired or may need to be effected.

In the course of attempting to effect an online transaction as part of his/her interaction with the network site implemented by the server $30_n$, certain information regarding a transaction object (hereinafter "transaction object information") may be provided by the user 10 via the end user equipment 12. A "transaction object" refers to any physical or virtual object designed to be used in an attempt to make a transaction. For example, a transaction object may constitute a payment card (e.g., a credit card, a debit card, etc.), an account (e.g., a bank account, an online wallet account, login credentials for accessing secure content or a VPN, etc.), an electronic check, a set of one or more digital cash (electronic money) certificates, or any other physical or virtual object designed to be used in an attempt to make a transaction. The transaction object information can therefore take on various forms.

For example, the transaction object information may include payment card information regarding a payment card in situations where, for instance, the user 10 desires to purchase or otherwise obtain a product/service/content offered on the network site implemented by the server $30_n$, pay a bill for a previously obtained product/service/content via the network site, or make a donation to a charity or other institution through the network site using the payment card. Such payment card information may be, for instance, credit card information regarding a credit card (e.g., a number, expiry date, and/or holder's name) or debit card information regarding a debit card (e.g., a number and/or holder's name). The payment card may comprise one or more card elements adapted to convey part or all of the payment card information, such as one or more sets of characters (e.g., printed and/or embossed characters), a magnetic stripe, and/or a chip (e.g., an EMV chip).

In another example, the transaction object information may include electronic check information regarding an electronic check (e.g., a check number and/or a checking account number) in situations where, for instance, the user 10 desires to effect a payment via the network site implemented by the server $30_n$ using the electronic check. In order to process the payment attempted to be effected by the user 10 using the electronic check, an entity (e.g., a bank or other financial institution, or the service provider) that allows the user 10 to use the electronic check may store on a computer-readable medium (e.g., as part of a database) information regarding the electronic check, including the electronic check information provided by the user 10.

In yet another example, the transaction object information may include digital cash information regarding a set of one or more digital cash certificates (e.g., digital cash certificate identifiers) in situations where, for instance, the user 10 desires to effect a payment via the network site implemented by the server $30_n$ using the set of one or more digital cash certificates. In order to process the payment attempted to be effected by the user 10 using the set of one or more digital cash certificates, an entity (e.g., a bank or other financial institution) that allows the user 10 to use the set of one or more digital cash certificates may store on a computer-readable medium (e.g., as part of a database) information regarding the set of one or more digital cash certificates, including the digital cash information provided by the user 10.

In a further example, the transaction object information may include account information regarding an account (e.g., an account number and/or holder's name and/or login credentials) in situations where, for instance, the user 10 desires to effect a transfer of funds to or from the account via the network site implemented by the server $30_n$, or where the user 10 desires to access secure online content or a VPN via the network site implemented by the server $30_n$. In order to process the attempted transfer or access, an entity (e.g., a bank or other financial institution, a corporate extranet server) that allows the user 10 to use the account may store on a computer-readable medium (e.g., as part of a database) information regarding the account, including the account information provided by the user 10.

Various possibilities exist for providing the transaction object information via the end user equipment 12. For example, the user 10 may use one or more of the at least one input device of the computing device 16 to enter the transaction object information and cause this information to be sent by the end user equipment 12 to the server $30_n$ (or another computer associated with the server $30_n$) over the packet-switched network 14. Alternatively, the transaction object information may have been previously stored in the memory 22 of the computing device 16, in which case the user 10 may use one or more of the at least one input device of the computing device 16 to cause the end user equipment 12 to send the previously stored transaction object information to the server $30_n$ (or another computer associated with the server $30_n$) over the packet-switched network 14.

Additionally, and in accordance with an embodiment of the present invention, the ability to successfully effect an online transaction with the network site implemented by the server $30_n$ involves the location object 24 being retrieved from the memory 22 of the computing device 16 and transmitted from the end user equipment 12 to the server $30_n$ (or another computer associated with the server $30_n$). The computing device 16 can be configured to effect this transmission according to various schemes, such as (i) autonomously once per online transaction; (ii) regularly without regard to any attempt to effect an online transaction; or (iii) upon request from the server $30_n$ when an online transaction is attempted or susceptible of being attempted. Still other schemes are possible and are within the scope of the present invention.

The online transaction attempted to be effected by the user 10 may be subjected to various conventional security measures intended to protect information exchanged between the end user equipment 12 and the packet-switched network 14 and to counter fraudulent online transactions. For example, the transaction object information provided by the user 10 via the end user equipment 12 may be encrypted (e.g., using the Secure Socket Layer (SSL) protocol) prior to being sent over the packet-switched network 14. In other examples, when the transaction object information includes payment card information regarding a payment card, card security code (CSC) verification may be employed whereby the user 10 is asked to enter the payment card's CSC, and/or address verification systems (AVS) may be employed whereby an address entered by the user 10 is compared to a billing address known to the payment card's issuing bank. Various other security measures may be employed in different cases.

Continuing with the embodiment illustrated in FIG. 1, there is provided a network element 51, hereinafter referred to as a transaction validation server. The transaction validation server 51 is operated, managed or otherwise associated with an entity responsible for validating online transactions. For example, this entity may be a bank or other financial institution that provides the transaction object to the user 10 (e.g., a card issuing bank in cases where the transaction object is a credit card or a debit card). This entity could also be the service provider if the transaction object is an account number of an account being held by the service provider for the user 10.

The transaction validation server 51 comprises suitable hardware, firmware, software, control logic, or a combination thereof for implementing a plurality of functional components, including an interface and a processing unit. The interface of the transaction validation server 51 is adapted to receive messages from and send messages to other servers and/or other computers, and to exchange data with other elements (e.g., databases).

For example, the transaction validation server 51 may be connected to the server $30_n$ (or another computer associated with the server $30_n$) via a communication path 55, over which the transaction validation server 51 receives transaction object information transmitted by the end user equipment 12 in relation to an online transaction attempted to be effected by the user 10. The communication path 55 may be established over the packet-switched network 14 and/or another network 59 (e.g., a financial network) and may traverse one or more network elements (e.g., gateways, other servers). The communication path 55 may take on various forms depending on the nature of the online transaction attempted to be effected by the user 10. An example of the communication path 55 will be described later on.

The processing unit of the transaction validation server 51 is adapted to effect various processing operations to implement that server's functionality. For example, the transaction validation server 51 is operative to use information included in a database 53 to validate the online transaction attempted to be made using the transaction object information provided by the user 10 via the end user equipment 12. In some embodiments, the transaction validation server 51 and the database 53 may be part of separate network elements and communicatively coupled to one another via a communication link, which may traverse one or more network elements and comprise one or more physical links and one or more logical links. In other embodiments, the transaction validation server 51 and the database 53 may be part of a common network element. In yet other embodiments, the database 53 may be distributed amongst a plurality of network elements and/or physical locations.

With additional reference to FIG. 2, there is shown an example of potential contents of the database 53. In this example, the database 53 stores a plurality of records 57$_1$ ... 57P. Each of the records 57$_1$ ... 57$_P$ is associated with a respective transaction object and contains (i) transaction object information pertaining to the respective transaction object and (ii) information to assist in validating an online transaction attempted using the transaction object information pertaining to the respective transaction object.

The information to assist in validating an online transaction attempted using the transaction object information pertaining to the transaction object associated with a given one of the records 57$_1$ ... 57$_P$ may comprise one or more of:

- a list of one or more "authorized transaction points", which are points from which attempts to make online transactions using this transaction object information are authorized (for example, by the entity responsible for validating online transactions). The location of an authorized transaction point (hereinafter "authorized transaction point location") may be expressed as a civic address, a set of geo-coordinates, or any other information identifying where the authorized transaction point is located;
- a list of one or more "unauthorized transaction points", which are points from which attempts to make online transactions using this transaction object information are not authorized (for example, by the entity responsible for validating online transactions). The location of an unauthorized transaction point (hereinafter "unauthorized transaction point location") may be expressed as a civic address, a set of geo-coordinates, or any other information identifying where the unauthorized transaction point is located;
- a spatio-temporal history of previous online transactions attempted using this transaction object information;
- etc.

Each of the records 57$_1$ ... 57$_P$ may also include ancillary information that may be required to process an online transaction attempted to be made using the transaction object information included in that record. Such ancillary information depends on the nature of the transaction object associated with that record and can thus take on many forms. For example, in a case where the transaction object associated with a given one of the records 57$_1$ ... 57$_P$ is a credit card, the ancillary information included in that record may include a credit limit, a balance due, a billing address (i.e., an address where credit card bills are to be sent), a shipping address, a list of recent transactions, and possibly other information regarding the credit card (e.g., other card holders' names).

Operation of the transaction validation server 51, as well as operation of other network elements in FIG. 1, will now be illustrated in the context of an example where the online transaction attempted to be made by the user 10 while interacting with the network site implemented by the server 30$_n$ involves the user 10 attempting to purchase a product/service/content offered on the network site using a particular credit card. Accordingly, for purposes of this example, the transaction validation server 51 is assumed to be a server associated with a card issuing bank, i.e., a financial institution that issued the particular credit card. In this example, therefore, each of the records 57$_1$ ... 57$_P$ is associated with a transaction object which is a credit card, and includes transaction object information which is credit card information regarding that credit card. In other embodiments, the transaction validation server 51 may be within the realm of the service provider, and can in fact be the same entity that caused storage of the location object 24 in the memory 22 of the end user equipment 12.

The user 10 interacts with the network site implemented by the server 30$_n$ using the computing device 16 of the end user equipment 12 in order to select the product/service/content that he/she desires to purchase. This may involve the user 10 using an online shopping cart implemented by the server 30$_n$. Upon selecting the desired product/service/content, the user 10 indicates that he/she desires to purchase that product/service/content, for instance, by selecting a "checkout" option on the network site.

The network site then prompts the user 10 to provide payment information to pay for the selected product/service/content. In this example, the user 10 thus proceeds to enter credit card information regarding the particular credit card. The user 10 then indicates his/her intent to submit an order to purchase the selected product/service/content using the entered credit card information, for instance, by selecting a "submit order" option on the network site.

Figure 3A:
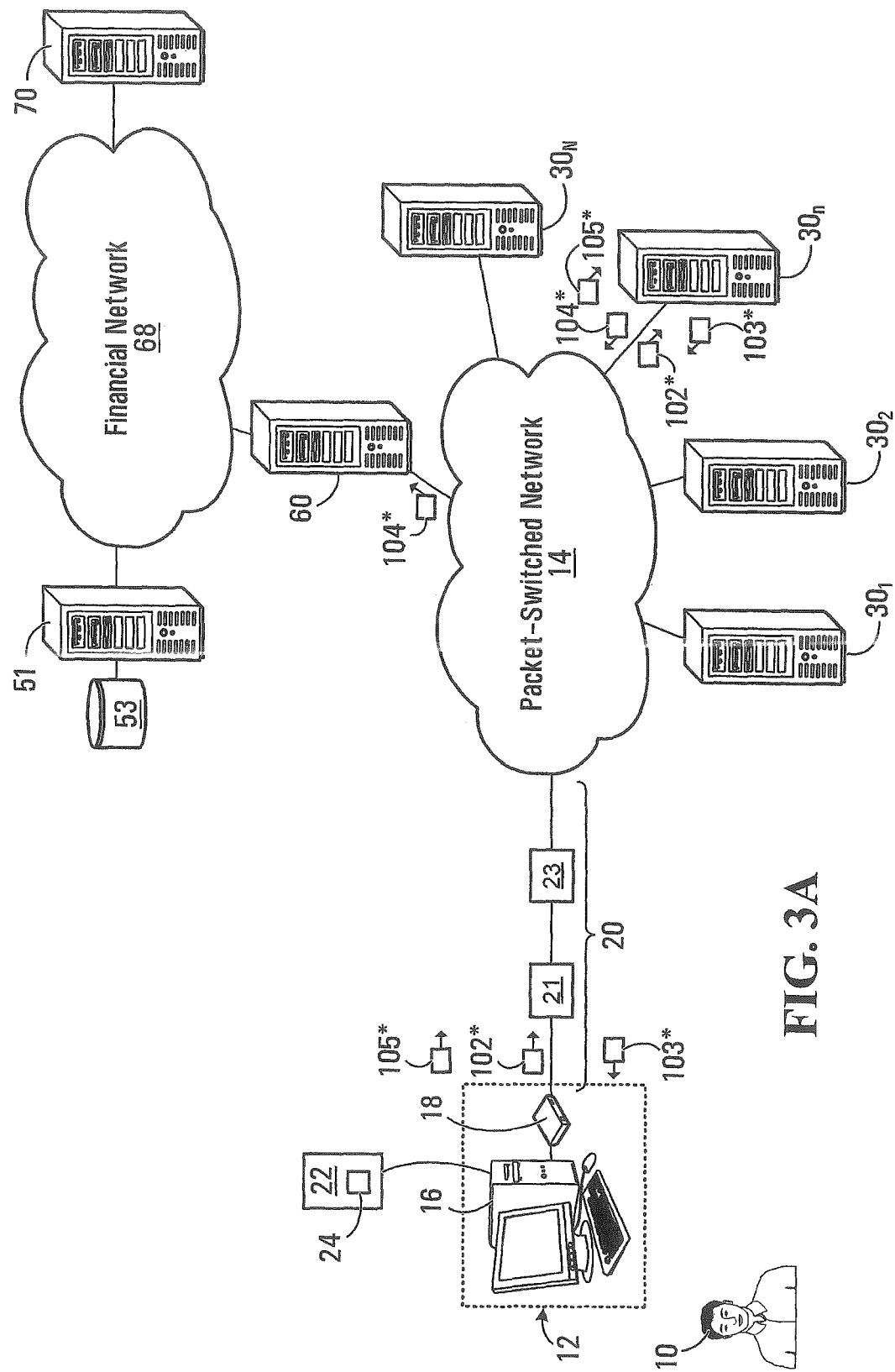
FIG. 3A shows an example of message flow in the architecture of FIG. 1, in the context of a transaction where a location object stored on end user equipment is provided to a server when specifically requested.

According to a first variant, and referring to FIG. 3A, the computing device 16 of the end user equipment 12 transmits to the server 30$_n$ a message 102*. In this example, the message 102* conveys: (i) order information indicative of the selected product/service/content; (ii) purchase amount information indicative of an amount to be paid to purchase the selected product/service/content; and (iii) the credit card information entered by the user 10 to purchase the selected product/service/content. Alternatively, the order information, the purchase amount information and possibly even the credit card information may already be known to the server 30$_n$ due to prior interaction between the computing device 16 and the server 30$_n$. In such a case, the message 102* may simply convey an indication or confirmation of a desire of the user 10 to purchase the selected product/service/content.

Additionally, the message 102* may also convey the logical identifier assigned to the end user equipment 12. Alternatively, the logical identifier assigned to the end user equipment 12 may not be conveyed by the message 102* but may already be known to the server 30$_n$ due to prior interaction between the computing device 16 and the server 30$_n$.

Since it travels over the packet-switched network 14, the information to be transmitted to the server 30$_n$ as part of the message 102* may be encrypted by the computing device 16 prior to being transmitted to the server 30$_n$. This encryption may be effected using the SSL protocol or some other encryption technique, by virtue of interaction between the computing device 16 and the server 30$_n$.

Upon receiving the message 102*, the server 30$_n$ processes the message 102*, possibly decrypting one or more of its portions. As part of its processing operations, the server 30$_n$ recognizes that an online transaction is attempted to be effected via the end user equipment 12 and proceeds to send a message 103* to the computing device 16 of the end user equipment 12. The message 103* contains a request to obtain the location object 24 stored in the memory 22 of the end user equipment 12.

When it receives the message 103*, the computing device 16 of the end user equipment 12 proceeds to generate and transmit to the server 30$_n$ a message 105* that conveys the location object 24 stored in the memory 22 of the end user equipment 12. Information conveyed by the message 105* may be encrypted prior to transmission to the server 30$_n$. In two examples not to be considered limiting, the message 103* may be in accordance with the DHCP or HTTP Enabled Location Delivery (HELD) protocols.

It should be appreciated that the end user equipment 12 has the ability to decide whether to release the message 105* and in fact may, under certain circumstances, decide not to release the message 105*. For example, the server $30_n$ may need to figure on a list of "trusted location object requesting" servers or it may need to pass a test in order to gain or assert an authorization to request the location object 24 from the end user equipment 12.

Upon receiving the message 105*, the server $30_n$ processes the message 105*, possibly decrypting one or more of its portions, and proceeds to send a message 104* to a "payment gateway" 60. The payment gateway 60 is a network element that is connected to a financial network 68 and that is used by the server $30_n$ to process online transactions attempted to be made via the network site implemented by the server $30_n$. The financial network 68 interconnects a plurality of servers or other computers associated with banks and/or other financial institutions, including, in this example, the transaction validation server 51 that is associated with the card issuing bank and a server 70 that is associated with an acquiring bank, i.e., a financial institution that is used by an entity, in this case, a merchant, which operates, manages or is otherwise associated with the server $30_n$. It should be appreciated that in certain embodiments, the financial network 68 may be part of the packet-switched network 14, may comprise individual point-to-point links or may be dispensed with altogether.

The message 104* sent to the payment gateway 60 may be generated by the server $30_n$ based on the message 102*, the message 105* and possibly other information known to the server $30_n$ (e.g., the order information, the purchase amount, the credit card information and/or the logical identifier assigned to the end user equipment 12). Ultimately, in this example, the message 104* conveys: (i) the purchase amount information indicative of an amount to be paid to purchase the selected product/service/content; (ii) the credit card information entered by the user 10 to purchase the selected product/service/content; and (iii) the location object 24. Information conveyed by the message 104* may be encrypted prior to transmission to the payment gateway 60.

Figure 3B:
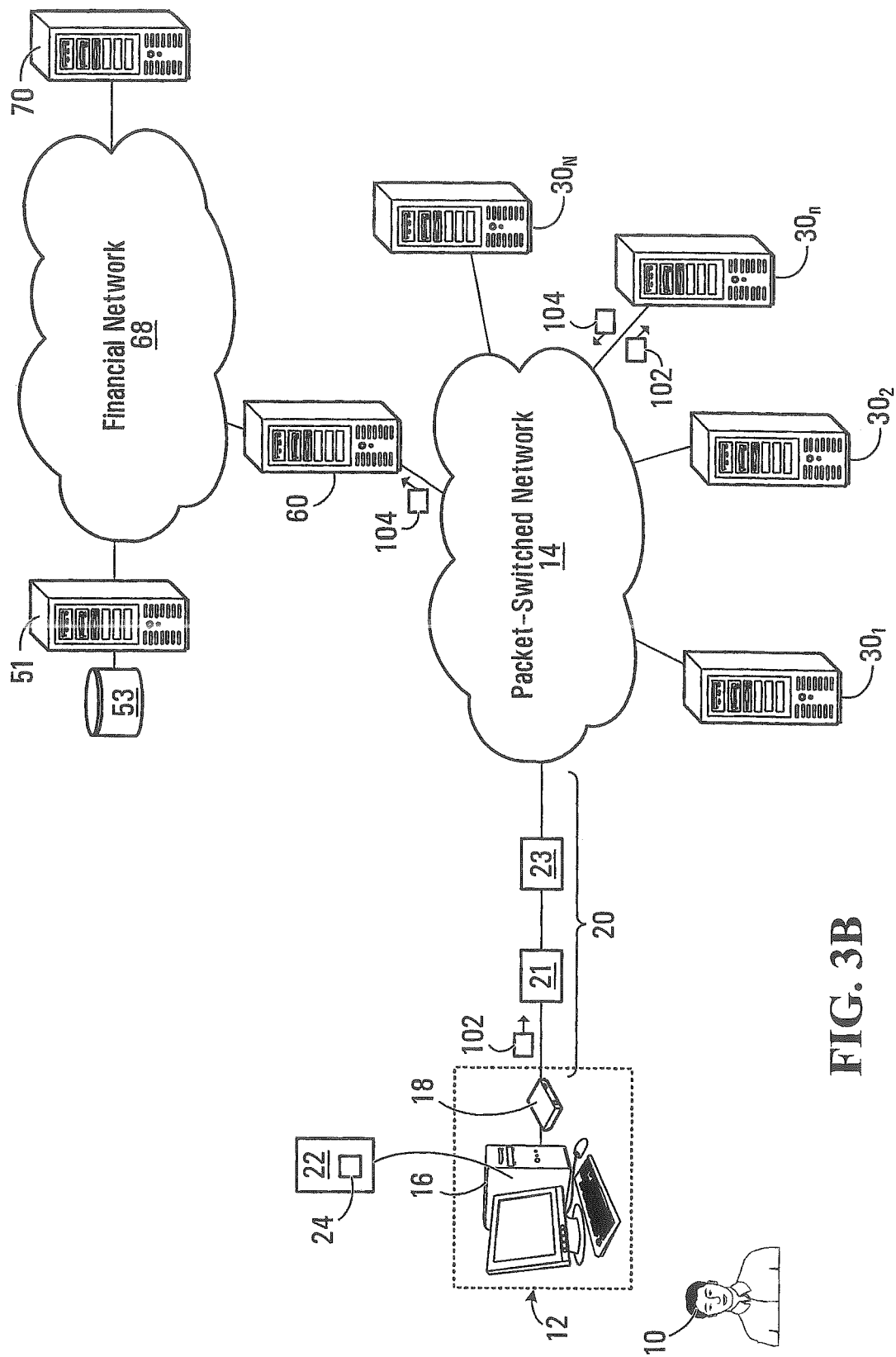
FIG. 3B shows an example of message flow in the architecture of FIG. 1, in the context of a transaction where a location object stored on end user equipment is provided at or prior to the time when the transaction is attempted.

According to a second variant, and with reference to FIG. 3B, the computing device 16 of the end user equipment 12 now transmits to the server $30_n$ a message 102. In this example, the message 102 conveys: (i) order information indicative of the selected product/service/content; (ii) purchase amount information indicative of an amount to be paid to purchase the selected product/service/content; and (iii) the credit card information entered by the user 10 to purchase the selected product/service/content. Alternatively, the order information, the purchase amount information and possibly even the credit card information may already be known to the server $30_n$ due to prior interaction between the computing device 16 and the server $30_n$. In such a case, the message 102 may simply convey an indication or confirmation of a desire of the user 10 to purchase the selected product/service/content.

Additionally, the message 102 may also convey the logical identifier assigned to the end user equipment 12. Alternatively, the logical identifier assigned to the end user equipment 12 may not be conveyed by the message 102 but may already be known to the server $30_n$ due to prior interaction between the computing device 16 and the server $30_n$.

Also, the message 102 may convey the location object 24 stored in the memory 22 of the end user equipment 12. Alternatively, the location object 24 may not be conveyed by the message 102 but may already be known to the server $30_n$ due to prior interaction between the computing device 16 and the server $30_n$. Under the present variant, no request is made for the location object 24; rather, the location object 24 is either sent in an unsolicited manner by the end user equipment 12 within message 102 or is already known to the server $30_n$.

Since it travels over the packet-switched network 14, the information to be transmitted to the server $30_n$ as part of the message 102 may be encrypted by the computing device 16 prior to being transmitted to the server $30_n$. This encryption may be effected using the SSL protocol or some other encryption technique, by virtue of interaction between the computing device 16 and the server $30_n$.

Upon receiving the message 102, the server $30_n$ processes the message 102, possibly decrypting one or more of its portions, and proceeds to send a message 104 to the payment gateway 60. The message 104 sent to the payment gateway 60 may be identical to the message 102, i.e., it may be a relayed version of the message 102. Alternatively, the message 104 may be generated by the server $30_n$ based on the message 102 and possibly other information known to the server $30_n$ (e.g., the order information, the purchase amount information, the credit card information, the logical identifier assigned to the end user equipment 12 and/or the location object 24). Ultimately, in this example, the message 104 conveys: (i) the purchase amount information indicative of an amount to be paid to purchase the selected product/service/content; (ii) the credit card information entered by the user 10 to purchase the selected product/service/content; and (iii) the location object 24. Information conveyed by the message 104 may be encrypted prior to transmission to the payment gateway 60.

Figure 4:
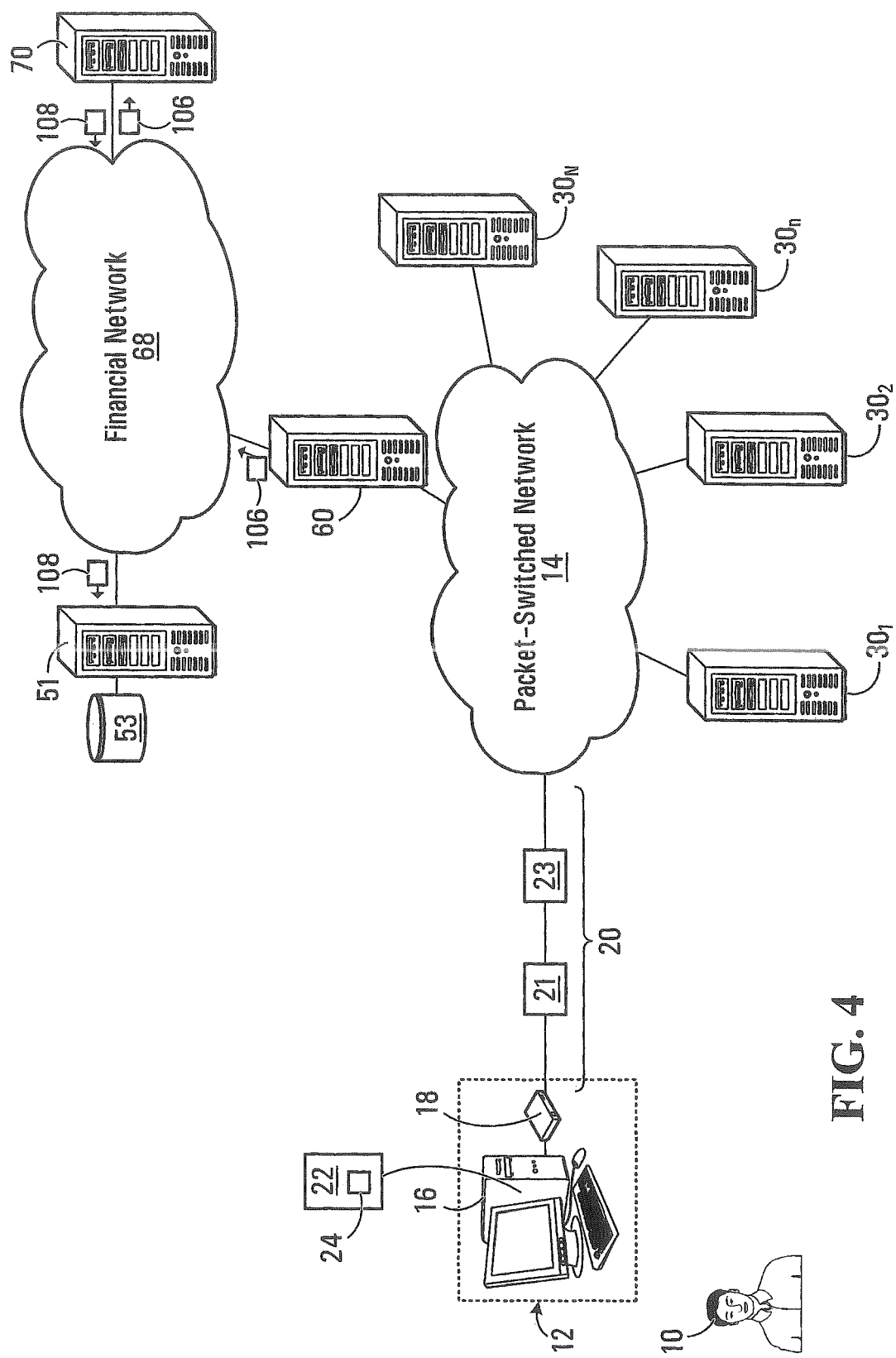
FIG. 4 shows an example of message flow that continues from FIGS. 3A and 3B, in the context of validation of the transaction based on the location object.

Reference is now made to FIG. 4, which applies to both of the above variants. Upon receiving the message 104 or 104*, the payment gateway 60 processes the message 104 or 104*, possibly decrypting one or more of its portions. Based on content of the message 104 or 104*, the payment gateway 60 determines that it originates from the server $30_n$ and proceeds to send a message 106, over the financial network 68, to the server 70, which is associated with the acquiring bank used by the merchant associated with the server $30_n$. The message 106, which can be viewed as a request for transaction authorization, is intended to elicit from the financial network 68 a response as to whether the online transaction attempted to be made by the user 10 is approved or denied. In this example, the payment gateway 60 generates the message 106 based on the message 104 or 104* such that the message 106 conveys: (i) the purchase amount information indicative of an amount to be paid to purchase the selected product/service/content; (ii) the credit card information entered by the user 10 to purchase the selected product/service/content; and (iii) the location object 24.

The server 70 receives the message 106 and processes it to gain knowledge that a transaction involving the merchant associated with the server $30_n$ is attempted to be effected. Based on the credit card information conveyed by the message 106, the server 70 proceeds to send a message 108 to the transaction validation server 51 over the financial network 68. The message 108 may be identical to the message 106, i.e., it may be a relayed version of the message 106. Alternatively, the message 108 may be generated by the server 70 based on the message 106 and possibly other information known to the server 70. Ultimately, in this example, the message 108 conveys: (i) the purchase amount information indicative of an amount to be paid to purchase the selected product/service/content; (ii) the credit card information entered by the user 10 to purchase the selected product/service/content; and (iii) the location object 24.

The transaction validation server 51, which is associated with the card issuing bank that issued the particular credit card that has been used by the user 10 to attempt to purchase the selected product/service/content, receives the message 108. The transaction validation server 51 proceeds to process the message 108 to determine whether the online transaction attempted to be made by the user 10 is to be approved or denied. Specifically, the transaction validation server 51 proceeds to validate the online transaction based at least in part on the location object 24.

To this end, the transaction validation server 51 consults the database 53 to identify a particular one of the records $57_1 \ldots 57_P$ that corresponds to the credit card information conveyed by the message 108. Upon identifying the particular one of the records $57_1 \ldots 57_P$, the transaction validation server 51 obtains the corresponding information that assists in validation of the online transaction. It is recalled that depending on the embodiment, such information may comprise one or more of:
- a list of one or more "authorized transaction points", which are points from which attempts to make online transactions using this credit card information are authorized;
- a list of one or more "unauthorized transaction points", which are points from which attempts to make online transactions using this credit card information are not authorized;
- a spatio-temporal history of previous online transactions made using this credit card information;
- etc.

With the above info illation, as well as knowledge of the location object 24, the transaction validation server 51 can validate the online transaction. The following considers validation in greater detail, with respect to the above three example types of information that assists in validation of the online transaction.

If the transaction validation server 51 determines that the credit card information conveyed by the message 108 is associated with an authorized transaction point location, the transaction validation server 51 proceeds to effect a verification as to whether the location specified by the location object 24 (and conveyed by the message 108) corresponds to this authorized transaction point location.

As discussed below, the transaction validation server 51 handles the online transaction in different manners depending on whether or not the location specified by the location object 24 corresponds to the authorized transaction point location associated with the credit card information.

If the location specified by the location object 24 supplied by the end user equipment 12 does not correspond to an authorized transaction point location, validation may be deemed unsuccessful. This may result in the online transaction being denied by the transaction validation server 51 without performing any further processing operations to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS), a phone call to verbally confirm legitimacy of the online transaction attempted to be made by the user 10, etc.

On the other hand, if the location specified by the location object 24 supplied by the end user equipment 12 does correspond to an authorized transaction point location, the transaction validation server 51 may conclude that the online transaction attempted to be made using the credit card information conveyed by the message 108 is authorized to be made from the location from which it is attempted. Alternatively, the fact that the location specified by the location object 24 supplied by the end user equipment 12 corresponds to an authorized transaction point location may simply be interpreted as successful completion of one among several steps in an overall authorization process.

The transaction validation server 51 may also perform other processing operations to determine whether the online transaction attempted to be made by the user 10 is to be approved or denied. For example, based on the ancillary information (e.g., a credit limit, a balance due, etc.) included in the particular one of the records $57_1 \ldots 57_P$ and the purchase amount information indicative of an amount to be paid to purchase the selected product/service/content that is conveyed by the message 108, the transaction validation server 51 may determine whether the online transaction is to be approved or denied. It will be appreciated that approval or denial of the online transaction may be determined by the transaction validation server 51 based on other factors.

If the transaction validation server 51 determines that the credit card information conveyed by the message 108 is associated with an unauthorized transaction point location, the transaction validation server 51 proceeds to effect a verification as to whether the location specified by the location object 24 (and conveyed by the message 108) corresponds to this unauthorized transaction point location.

As discussed below, the transaction validation server 51 handles the online transaction in different manners depending on whether or not the location specified by the location object 24 corresponds to the unauthorized transaction point location associated with the credit card information.

If the location specified by the location object 24 supplied by the end user equipment 12 does correspond to an unauthorized transaction point location, validation may be deemed unsuccessful. This may result in the online transaction being denied by the transaction validation server 51 without performing any further processing operations to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS), a phone call to verbally confirm legitimacy of the online transaction attempted to be made by the user 10, etc.

On the other hand, if the location specified by the location object 24 supplied by the end user equipment 12 does not correspond to an unauthorized transaction point location, the transaction validation server 51 may conclude that the online transaction attempted to be made using the credit card information conveyed by the message 108 is authorized to be made from the location from which it is attempted. Alternatively, the fact that the location specified by the location object 24 supplied by the end user equipment 12 does not correspond to an unauthorized transaction point location may simply be interpreted as successful completion of one among several steps in an overall authorization process.

The transaction validation server 51 may also perform other processing operations to determine whether the online transaction attempted to be made by the user 10 is to be approved or denied. For example, based on the ancillary information (e.g., a credit limit, a balance due, etc.) included in the particular one of the records $57_1 \ldots 57_P$ and the purchase amount information indicative of an amount to be paid to purchase the selected product/service/content that is conveyed by the message 108, the transaction validation server 51 may determine whether the online transaction is to be approved or denied. It will be appreciated that approval or denial of the online transaction may be determined by the transaction validation server 51 based on other factors.

If the information to assist in validation of the online transaction that is included in the particular one of the records $57_1 \ldots 57_P$ comprises a spatio-temporal history of previous online transactions made using the credit card information included in that record, the transaction validation server 51 may compare the location specified by the location object 24 (and conveyed by the message 108) and possibly a time at which the online transaction is attempted to be made (which may be conveyed by the message 108 or otherwise obtained by the transaction validation server 51) to the spatio-temporal history of previous online transactions.

As discussed below, the transaction validation server 51 handles the online transaction in different manners depending on whether the location specified by the location object 24 and possibly the time at which the online transaction is attempted to be made compare favorably (i.e., are consistent) or unfavorably (i.e., are inconsistent) with the spatio-temporal history of previous online transactions.

If the location specified by the location object 24 and possibly the time at which the online transaction is attempted to be made compare unfavorably with the spatio-temporal history of previous online transactions, validation may be deemed unsuccessful. In a specific non-limiting example, if all or a majority of the online transactions made using the credit card information included in particular one of the records $57_1 \ldots 57_P$ over the last three (3) months have been made from a specific location (e.g., a specific civic address) and the location specified by the location object 24 supplied by the end user equipment 12 does not correspond to this specific location, validation may be deemed unsuccessful. In another specific non-limiting example, if a previous online transaction has been made using the credit card information included in particular one of the records $57_1 \ldots 57_P$ from a specific location a short time ago and the location specified by the location object 24 supplied by the end user equipment 12 is far (e.g., situated at least a certain distance or more from) this specific location, validation may be deemed unsuccessful. In these and other examples, this may result in the online transaction being denied by the transaction validation server 51 without performing any further processing operations to assess whether it should be approved or denied. Alternatively, the transaction validation server 51 may perform additional processing operations to determine whether the online transaction attempted to be made by the user 10 is to be approved or denied, including processing operations to re-assess legitimacy of the online transaction attempted to be made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS), a phone call to verbally confirm legitimacy of the online transaction attempted to be made by the user 10, etc.

On the other hand, if the location specified by the location object 24 supplied by the end user equipment 12 and possibly the time at which the online transaction is attempted to be made compare favorably with the spatio-temporal history of previous online transactions, the transaction validation server 51 concludes that the online transaction attempted to be made using the credit card information conveyed by the message 108 is consistent with one or more previous online transactions made using this credit card information.

The transaction validation server 51 may also perform other processing operations to determine whether the online transaction attempted to be made by the user 10 is to be approved or denied. For example, based on the ancillary information (e.g., a credit limit, a balance due, etc.) included in the particular one of the records $57_1 \ldots 57_P$ and the purchase amount information indicative of an amount to be paid to purchase the selected product/service/content that is conveyed by the message 108, the transaction validation server 51 may determine whether the online transaction is to be approved or denied. It will be appreciated that approval or denial of the online transaction may be determined by the transaction validation server 51 based on other factors.

Figure 5:
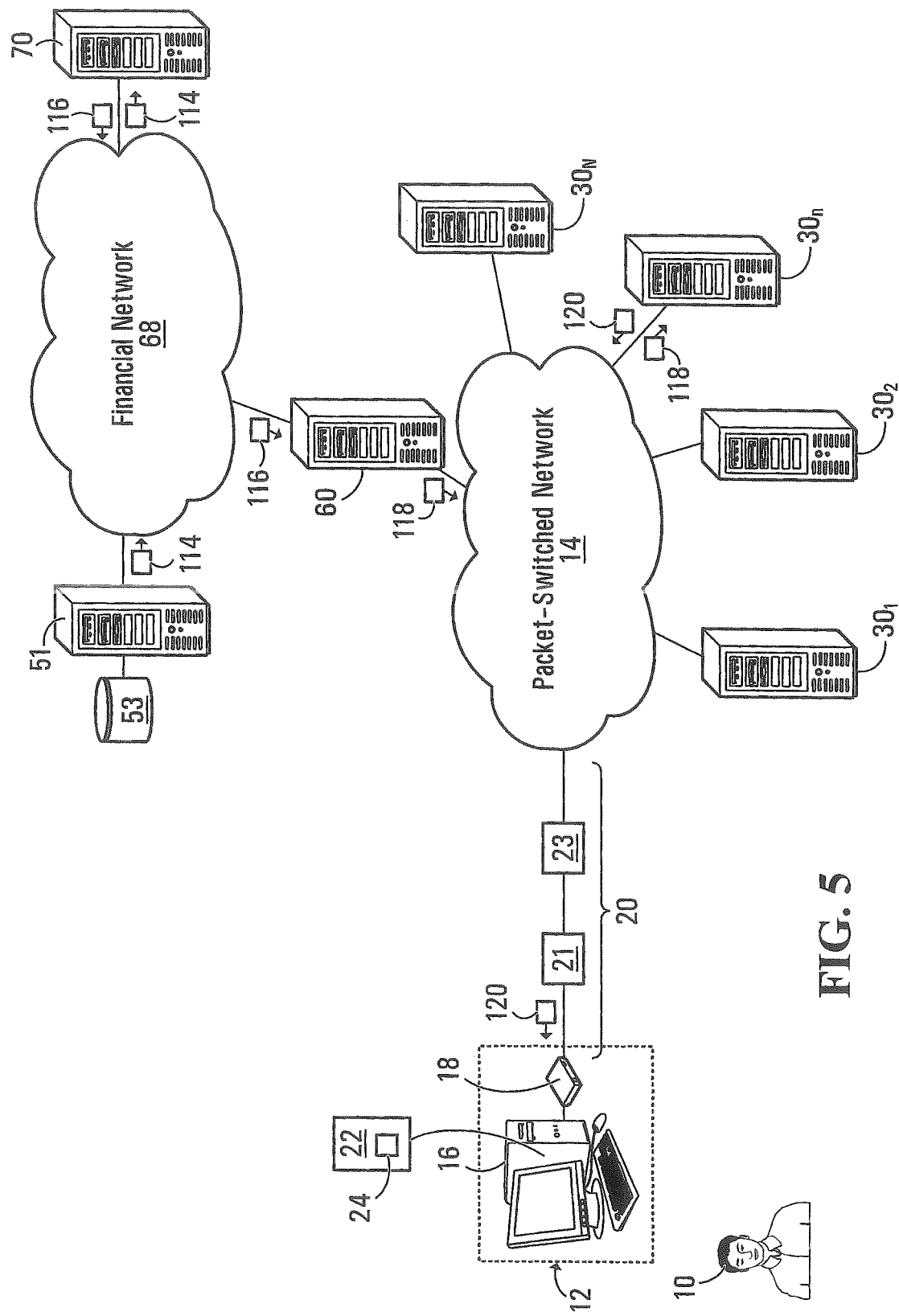
FIG. 5 shows an example of message flow that continues from FIG. 4, in the context of post-validation processing.

Post-validation processing is now described with reference to FIG. 5. Specifically, upon determining whether the online transaction is approved or denied, the transaction validation server 51 returns a message 114 to the server 70 over the financial network 68. The message 114 indicates whether the online transaction was approved or denied.

If the online transaction was denied, the message 114 may indicate (e.g., by a code) a reason for this denial, such as insufficient funds, an unavailable bank link, etc. In cases where it denies the online transaction as being potentially fraudulent, the transaction validation server 51 may also take further action, such as freezing a credit account corresponding to the particular credit card, informing fraud prevention and/or law enforcement authorities of a possible attempt to make a fraudulent online transaction, etc.

If the online transaction was approved, the transaction validation server 51 may update the particular one of the records $57_1 \ldots 57_P$ associated with the particular credit card to take into account approval of the online transaction. For example: one or more elements of ancillary information (e.g., a balance due, an available credit, etc.) included in the particular one of the records $57_1 \ldots 57_P$ may be updated to reflect the approved online transaction; if the information to assist in validation of an online transaction that is included in the particular one of the records $57_1 \ldots 57_P$ comprises a spatio-temporal history of previous online transactions made using the credit card information corresponding to that record, this spatio-temporal history may be updated to reflect the approved online transaction; etc.

The server 70 receives the message 114 and processes it to determine whether the online transaction was approved or denied. If approved, the online transaction is eventually settled via a settlement process involving the acquiring bank and the card issuing bank. This settlement process is well known and thus not described herein.

The server 70 proceeds to return a message 116 to the payment gateway 60. The message 116 may be identical to the message 114, i.e., it may be a relayed version of the message 114. Alternatively, the message 116 may be generated by the server 70 based on the message 114. The message 116 indicates whether the online transaction is approved or denied and, if applicable, may indicate a reason for denial of the online transaction.

Upon receiving the message 116, the payment gateway 60 processes it and proceeds to send a message 118 to the server $30_n$. Generated by the payment gateway 60 on a basis of the message 116, the message 118 indicates whether the online transaction is approved or denied and, if applicable, may indicate a reason for denial of the online transaction. Information conveyed by the message 118 may be encrypted by the payment gateway 60 prior to being transmitted to the server $30_n$.

The server $30_n$ receives the message 118. The server $30_n$ processes the message 118, possibly decrypting one or more of its portions, to ascertain whether the online transaction is approved or denied. Approval or denial of the online transaction (and a reason for denial, if applicable) may be recorded by the server $30_n$ for future reference. The server $30_n$ proceeds to send a message 120 to the computing device 16 of the end user equipment 12 in order to communicate approval or denial of the online transaction to the user 10. Since it travels over the packet-switched network 14, information conveyed by the message 120 may be encrypted by the server $30_n$ prior to being transmitted to the computing device 16.

Upon receiving the message 120, the computing device 16 processes the message 120, possibly decrypting one or more of its portions, so as to communicate approval or denial of the online transaction to the user 10. For example, this may be achieved by displaying a "transaction approved" or "transaction denied" message (or any conceivable variant thereof) on the display of the computing device 16.

It will thus be appreciated that a fraudulent online transaction using credit card information becomes considerably more difficult to make for an individual who maliciously or otherwise without entitlement (e.g., via identity theft, loss or stealing of the particular credit card, etc.) obtained this credit card information and/or the particular credit card, since it requires the end user equipment used by such individual to send a location object specifying an acceptable location for that transaction.

To ensure the integrity of the location object 24, there may be implemented a security feature that prevents such acts as tampering with the location object 24 while it is stored in the memory 22 of the computing device 16. The location object 24 may also be subjected to various security measures intended to protect the location object 24 between its receipt from the service provider and its transmission to a network site in the context of an online transaction. Such security measures include encryption on the wire, encryption of the location object 24 itself and applying a digital signature to the location object 24 (using mechanisms such as XML digital signature), to name a few non-limiting possibilities.

In the case where the location object 24 has been encrypted, the server $30_n$, the transaction validation server 51 and/or the server 70 may, upon obtaining the encrypted location object 24 from the communication apparatus 12, proceed to decrypt the location object 24. For instance, the server $30_n$, the transaction validation server 51 and/or the server 70 may proceed to decrypt the location object 24 using a decryption key that is obtained from the service provider (e.g., from the network element 23 or another network component operated by the service provider), possibly in return for payment to the service provider. In some cases, the network element 23 (or another network component operated by the service provider) may provide the decryption key to the server $30_n$, the transaction validation server 51 and/or the server 70 in response to a request received therefrom. In other cases, the network element 23 (or another network component operated by the service provider) may have previously provided the decryption key to the server $30_n$, the transaction validation server 51 and/or the server 70 by virtue of a trust relationship established between the service provider and the entity operating the server $30_n$, the transaction validation server 51 and/or the server 70. Under such an encryption/decryption scheme, the service provider can effectively control use of the location object 24 (that it caused to be stored on the communication apparatus 12) by network components such as the server $30_n$, the transaction validation server 51 and/or the server 70.

Although the above-described example relates to an online transaction involving an online purchase using a credit card, it will be recognized that principles described herein apply to other types of online transactions, including, for example, those involving online purchases or payments using other payment objects (e.g., digital cash, electronic checks), online fund transfers involving accounts (e.g., bank accounts, online wallet accounts), attempts to access secure online content; and attempts to access a virtual private network, to name a few non-limiting possibilities.

Also, in the variant presented above, the message 103* containing a request to obtain the location object 24 stored in the memory 22 of the end user equipment 12 was generated by the server $30_n$. However, it should be appreciated that in various alternative embodiments, the message 103* may be generated by other network entities involved in processing of the transaction and at various instances, such as:

by the server 70 upon receipt of message 106 from the payment gateway 60;
 by the transaction validation server 51 upon receipt of the message 108 from the server 70; or
 by the server 70 upon receipt of the message 114 from the transaction validation server 51.

It should be reiterated that the end user equipment 12 has the ability to decide whether to release a message in response to the message 103* and containing the location object 24. That is to say, the end user equipment 12 may, under certain circumstances, decide not to release the response. For example, it is envisaged that requesting entity (e.g., the server 70 or the transaction validation server 51 in the previous paragraph) may need to be on a list of "trusted location object requesting" servers or it may need to undergo a test in order to gain or assert an authorization to request the location object 24 from the end user equipment 12.

Still other possibilities are within the scope of the present invention.

It should further be appreciated that although the payment gateway 60, the server 70, the transaction validation server 51 and the server $30_n$ have been described as separate entities, this has been done for convenience and illustration only. It should therefore be understood that in certain embodiments, any one or more of the payment gateway 60, the server 70, the transaction validation server 51 and the server $30_n$ may be integrated into a single network entity or component.

It should also be appreciated that although the above references to online transactions have involved the computing device 16 effecting an online transaction with a network site over the packet-switched network 14, it is also within the scope of the invention for the computing device 16 to be implemented as a communication device and to effect an online transaction with a called party reachable over the packet-switched network 14. Specifically, the communication device could be embodied as a VoIP phone, a Plain Old Telephone Service (POTS) phone equipped with an analog terminal adapter (ATA), or a soft phone (i.e., a computer equipped with telephony software). For its part, one party can be a purveyor of goods or services. In this scenario, the location object 24 is conveyed from the communication device to the purveyor of goods or services.

In addition, while in the above-described example certain messages are exchanged between various elements of the architecture depicted in FIG. 1, it will be appreciated that different messages may be exchanged in other embodiments.

Those skilled in the art will also appreciate that, in some embodiments, certain functionality of a given component described herein (e.g., the transaction validation server 51) may be implemented as pre-programmed hardware or firmware elements (e.g., application specific integrated circuits (ASICs), electrically erasable programmable read-only memories (EEPROMs), etc.) or other related elements. In other embodiments, a given component described herein (e.g., the transaction validation server 51) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

What is claimed is:

1. A system for validating an online transaction comprising:
   a network element within a service provider's communication network, the network element configured to:
      determine a location of end user equipment within the communication network;
      encrypt the location into an encrypted location object using an encryption key; and
      cause an encrypted location object of the location to be transmitted to the end user equipment;
   end user equipment located at a user's premise and coupled to the communication network, the end user equipment configured to:
      receive and store the encrypted location object transmitted by the network element;
      transmit transaction object information for an online transaction attempted by the end user equipment; and
      transmit the stored encrypted location object; and
   a transaction processor coupled to the communication network, the transaction processor configured to:
      receive the transaction object information for the attempted online transaction transmitted from the end user equipment;
      receive the encrypted location object transmitted from the end user equipment;
      receive a decryption key used to decrypt the location object encrypted by the network element using the encryption key;
      decrypt the received encrypted location object transmitted from the end user equipment using the received decryption key; and
      validate the transaction object information for the attempted online transaction based at least in part on the decrypted location information.

2. The system of claim 1, wherein the transaction processor is further configured to:
   obtain information to assist in validating online transactions attempted using the transaction object information; and
   validate the transaction object information for the attempted online transaction based at least in part on a comparison of the decrypted location information and the information to assist in validating online transactions attempted using the transaction object information.

3. The system of claim 2, wherein the information to assist in validating online transactions attempted using the transaction object information includes at least one authorized transaction point location, and wherein the validation action comprises handling the online transaction in a first manner if the location specified by the decrypted location information corresponds to at least one of the at least one authorized transaction point location.

4. The system of claim 2, wherein the information to assist in validating online transactions attempted using the transaction object information includes at least one unauthorized transaction point location, and wherein the validation action comprises handling the online transaction in a first manner if the location specified by the decrypted location information corresponds to at least one of the at least one unauthorized transaction point location.

5. The system of claim 2, wherein obtaining the information to assist in validating online transactions attempted using the transaction object information comprises consulting a database on a basis of the transaction object information.

6. The system of claim 2, wherein obtaining the information to assist in validating online transactions attempted using the transaction object information comprises receiving a message conveying the information to assist in validating online transactions attempted using the transaction object information.

7. The system of claim 1, wherein the location object specifies a service point location associated with a current location of the end user equipment expressed as one or more of:
   a civic address; and
   a set of geo-coordinates.

8. The system of claim 1, wherein the transaction object information comprises at least one of:
   payment card information regarding a payment card;
   electronic check information regarding an electronic check;
   digital cash information regarding a set of at least one digital cash certificate; and
   account information regarding an account.

9. The system of claim 1, wherein the transaction processor is further configured to:
   transmit a request for the encrypted location object of the end user equipment attempting the online transaction.

10. The system of claim 1, wherein validating the transaction object information for the attempted online transaction comprises either approving or denying the attempted online transaction.

\* \* \* \* \*